(12) United States Patent
Sohn et al.

(10) Patent No.: US 10,868,359 B2
(45) Date of Patent: Dec. 15, 2020

(54) HYBRID ON BOARD UNIT AND ROADSIDE UNIT SUPPORTING WAVE-V2X AND C-V2X

(71) Applicant: IT-Telecom Co., Ltd., Anyang (KR)

(72) Inventors: Beom Jun Sohn, Seoul (KR); Kwang Joo Choi, Seoul (KR)

(73) Assignee: IT-TELECOM CO., LTD., Anyang (KR)

( * ) Notice: Subject to any disclaimer, the term of this patent is extended or adjusted under 35 U.S.C. 154(b) by 16 days.

(21) Appl. No.: 16/299,158

(22) Filed: Mar. 12, 2019

(65) Prior Publication Data

US 2019/0296426 A1 Sep. 26, 2019

(30) Foreign Application Priority Data

Mar. 26, 2018 (KR) .......................... 10-2018-0034591

(51) Int. Cl.
| | |
|---|---|
| *H01Q 1/32* | (2006.01) |
| *H01Q 5/35* | (2015.01) |
| *H01Q 5/50* | (2015.01) |
| *H01Q 21/30* | (2006.01) |

(52) U.S. Cl.
CPC ................ *H01Q 1/32* (2013.01); *H01Q 5/35* (2015.01); *H01Q 5/50* (2015.01); *H01Q 21/30* (2013.01)

(58) Field of Classification Search
CPC ........ H01Q 21/28; H01Q 1/3275; H01Q 1/32; H01Q 1/38; H01Q 1/521; H01Q 9/0407; H01Q 1/243; H01Q 1/48; H01Q 13/10; H01Q 1/002; H01Q 1/02
See application file for complete search history.

(56) References Cited

U.S. PATENT DOCUMENTS

| | | | | |
|---|---|---|---|---|
| 2018/0366838 A1* | 12/2018 | Kim | ..................... | H01Q 1/3266 |
| 2019/0089419 A1* | 3/2019 | Kim | ..................... | H01Q 1/325 |
| 2019/0267702 A1* | 8/2019 | Shiroki | ..................... | H01Q 3/26 |
| 2020/0077279 A1* | 3/2020 | Foerster | ................. | H04W 4/40 |

FOREIGN PATENT DOCUMENTS

| | | |
|---|---|---|
| KR | 1020060025422 A1 | 1/2007 |
| KR | 1020080041117 A1 | 5/2008 |
| KR | 1020160038319 A1 | 4/2016 |
| WO | 2017189035 A1 | 11/2017 |

OTHER PUBLICATIONS

Publisher:JP2019149612A (Original Document), Date: Feb. 26, 2018, p. 1-16, Author: Shiroki (Year: 2018).*
Publisher:JP2019149612A (Translation), Date: Feb. 26, 2018, p. 1-16, Author: Shiroki (Year: 2018).*

* cited by examiner

*Primary Examiner* — Wei (Victor) Y Chan
(74) *Attorney, Agent, or Firm* — Patent Office of Dr. Chung Park

(57) ABSTRACT

The present disclosure provides a hybrid vehicle on board unit for supporting WAVE-V2X and C-V2X or a vehicle on board unit and a roadside unit supporting both WAVE-V2X and LTE-V2X or a vehicle on board unit and a roadside unit supporting all of WAVE-V2X, LTE-V2X and 5G-V2X or a vehicle on board unit and a roadside unit supporting WAVE-V2X, LTE-V2X, 5G-V2X and LTE communication or a vehicle on board unit and a roadside unit supporting WAVE-V2X, LTE-V2X, 5G-V2X, LTE communication and 5G communication.

4 Claims, 8 Drawing Sheets

HYBRID ON BOARD UNIT AND ROADSIDE UNIT SUPPORTING WAVE-V2X AND C-V2X

FIELD

The present disclosure relates to a communication system, and more particularly to a hybrid on board unit and a roadside unit supporting WAVE-V2X and C-V2X.

BACKGROUND

V2X refers to exchanging information with other vehicles and objects where infrastructures are established such as roads or the technology thereof. V2X consists of four types of communication: Vehicle to Vehicle (V2V), Vehicle to Infrastructure (V2I), Vehicle to Pedestrian (V2P) and Vehicle to Network (V2N). V2X is a base technology for future automobiles that will be safe and connected via communication, and a core technology that will enable completely automated transportation infrastructures.

As the V2X technology market expands, major companies and research groups of various countries are conducting researches for technology development and technology standardization in order to gain the upper hand in the autonomous vehicle market. Communication standard technologies for V2X include Wireless Access in Vehicular Environment (WAVE) of the DSRC method and LTE V2X of the cellular V2X (C-V2X) method. The WAVE and C-V2X have different protocol stacks, and their methods of modulating data are different as well, and thus a WAVE terminal cannot process C-V2X signals, and a C-V2X terminal cannot process WAVE signals either.

WAVE is an improved standard of IEEE 802.11p WIFI technology which is the most widely used short-distance communication standard. WAVE was completed in 2012. It is almost the only standard for automobile communication, and a technology led by the ministries of transportation of most countries including the United States. The Ministry of Land, Infrastructure and Transport of the Republic of Korea is also showing initiative in providing trial services and the like.

Upon receiving requests sent by each vehicle and infrastructure through roadside units, LTE V2X may determine the priority and order of frequency allocation. Upon receiving the emergency requests, LTE V2X may secure some of the frequencies of existing communication, and reallocate them, thereby contributing to stable autonomous driving operations. Since it is a standard derived from LTE, LTE V2X is being led by the European-oriented 3GPP.

Currently, it is unknown whether WAVE or LTE-V2X will be used as the V2X standard in Korea. There is a possibility that both technologies will co-exist and be used. If the two technologies were to co-exist and be used, vehicles and roadside units must have modules that could transceive and process both of the technologies in order to make a smooth V2X communication. However, there is no vehicle on board unit or roadside unit that could process both WAVE and LTE-V2X, and thus there is a problem that if commercialization is made in the form where WAVE and LTE-V2X co-exist, V2X communication could not be made smoothly.

PRIOR ART LITERATURE

Patent

Korean Patent Registration 10-0670777

SUMMARY

In order to solve the aforementioned problem, the purpose of the present disclosure is to provide a vehicle on board unit and a roadside unit supporting both WAVE-V2X and LTE-V2X.

Another purpose of the present disclosure is to provide a vehicle on board unit and a roadside unit supporting all of WAVE-V2X, LTE-V2X and 5G-V2X.

Another purpose of the present disclosure is to provide a vehicle on board unit and a roadside unit supporting WAVE-V2X, LTE-V2X, 5G-V2X and LTE communication.

Another purpose of the present disclosure is to provide a vehicle on board unit and a roadside unit supporting WAVE-V2X, LTE-V2X, 5G-V2X, LTE communication and 5G communication.

In order to achieve the aforementioned purposes, a hybrid vehicle on board unit supporting WAVE-V2X and C-V2X according to an embodiment of the present disclosure V2X communication may include a WAVE-V2X antenna for transceiving a WAVE-V2X signal; an LTE-V2X antenna for transceiving an LTE-V2X signal; an LTE antenna for transceiving an LTE signal; a GNSS antenna for transceiving a GNSS signal; a WAVE-V2X communication module for demodulating the WAVE-V2X signal received through the WAVE-V2X antenna to obtain WAVE-V2X communication information, and for modulating the WAVE-V2X communication information to generate the WAVE-V2X signal; an LTE-V2X communication module for demodulating the LTE-V2X signal received through the LTE-V2X antenna to obtain LTE-V2X communication information, and for modulating the LTE-V2X communication information to generate the LTE-V2X signal; a GNSS module for processing the GNSS signal received through the GNSS antenna to obtain location information of a vehicle; an LTE module for processing the LTE signal received through the LTE antenna to obtain additional information for operation of the vehicle, and for transmitting the WAVE-V2X communication information or the LTE-V2X communication information and the location of the vehicle to an external central control server through the LTE antenna; and a controller for determining a signal having a greater intensity of the WAVE-V2X signal received through the WAVE-V2X antenna and the LTE-V2X signal received through the LTE-V2X antenna, and for controlling the WAVE-V2X communication module and the LTE-V2X communication module to process only the one determined signal.

Preferably, the controller may control the WAVE-V2X communication module and the LTE-V2X communication module to process both the WAVE-V2X signal received through the WAVE-V2X antenna and the LTE-V2X signal received through the LTE-V2X antenna, and the controller may compare the WAVE-V2X communication information obtained by processing the WAVE-V2X signal and the LTE-V2X communication information obtained by processing the LTE-V2X signal to check whether data overlaps, and controls the WAVE-V2X communication module and the LTE-V2X communication nodule to delete overlapping data and to transmit only non-overlapping data.

Preferably, in response to the WAVE-V2X communication information obtained by processing the WAVE-V2X signal and the LTE-V2X communication information obtained by processing the LTE-V2X signal being information received from a same vehicle on board unit or roadside unit, the controller may control the WAVE-V2X communication module and the LTE-V2X communication module to mutually verify the WAVE-V2X communication information and the LTE-V2X communication information and to complement accuracy of information.

Preferably, the hybrid vehicle on board unit supporting WAVE-V2X and C-V2X may further include a 5G-V2X antenna for transceiving a 5G-V2X signal; and a 5G-V2X communication module for demodulating the 5G-V2X signal received through the 5G-V2X antenna to obtain 5G-V2X communication information, and for modulating the 5G-V2X communication information to generate the 5G-V2X signal, and the LTE module may transmit the WAVE-V2X communication information, the LTE-V2X communication information or 5G-V2X communication information and the location information of the vehicle to the external central control server through the LTE antenna, and the controller may control the WAVE-V2X communication module, the LTE-V2X communication module and the 5G-V2X communication module to determine the signal having a greater intensity from among the WAVE-V2X signal received through the WAVE-V2X antenna, the LTE-V2X signal received through the LTE-V2X antenna, and the 5G-V2X signal received through the 5G-V2X antenna, and to control the WAVE-V2X communication module, the LTE-V2X communication module and the 5G-V2X communication module to process only the one determined signal.

A roadside unit supporting WAVE-V2X and C-V2X according to another embodiment of the present disclosure may include a WAVE-V2X antenna for transceiving a WAVE-V2X signal; an LTE-V2X antenna for transceiving an LTE-V2X signal; an LTE antenna for transceiving an LTE signal; a GNSS antenna for transceiving a GNSS signal; a WAVE-V2X communication module for demodulating the WAVE-V2X signal received through the WAVE-V2X antenna to obtain WAVE-V2X communication information, and for modulating the WAVE-V2X communication information to generate the WAVE-V2X signal; an LTE-V2X communication module for demodulating the LTE-V2X signal received through the LTE-V2X antenna to obtain LTE-V2X communication information, and for modulating the LTE-V2X communication information to generate the LTE-V2X signal; a GNSS module for processing the GNSS signal received through the GNSS antenna to obtain location information of the roadside unit; an LTE module for processing the LTE signal received through the LTE antenna to obtain additional information for operation of the roadside unit, and for transmitting the WAVE-V2X communication information or the LTE-V2X communication information and the location information of the roadside unit to an external central control server through the LTE antenna; and a controller for determining a signal having a greater intensity from among the WAVE-V2X signal received through the WAVE-V2X antenna and the LTE-V2X signal received through the LTE-V2X antenna, and for controlling the WAVE-V2X communication module and the LTE-V2X communication module to process only the one determined signal.

The present disclosure may provide a vehicle on board unit and a roadside unit supporting both WAVE-V2X and LTE-V2X.

The present disclosure may provide a vehicle on board unit and a roadside unit supporting all of the WAVE-V2X, LTE-V2X and 5G-V2X.

The present disclosure may provide a vehicle on board unit and a roadside unit supporting WAVE-V2X, LTE-V2X, 5G-V2X and LTE communication.

The present disclosure may provide a vehicle on board unit and a roadside unit supporting WAVE-V2X, LTE-V2X, 5G-V2X, LTE communication and 5G communication.

DETAILED DESCRIPTION

This application was funded by Korea National R&D Project under Assignment identification number: GK20N0500, Department Name: Ministry of Science and ICT, Research Management Organization: Giga Korea Foundation, Research Project Name: Giga Korea, Research Title: 5G V2X Convergence Technology Development and Trial for Autonomous Driving and C-ITS Service, Contribution Rate: 1/1, Organizer: KT, Research Period: 2018 Apr. 1~2020 Dec. 31. Hereinbelow, specific contents for implementing the present disclosure will be explained with reference to the drawings attached. Further, in explaining the present disclosure, in a case where there is a possibility that a well-known content may obscure the essence of the present disclosure unnecessarily, detailed explanation on that well-known content will be omitted.

Hybrid Vehicle on Board Unit for V2X Communication

Referring to FIGS. 1 to 4, a hybrid vehicle on board unit for V2X communication according to an embodiment of the present disclosure will be explained.

Figure 1:
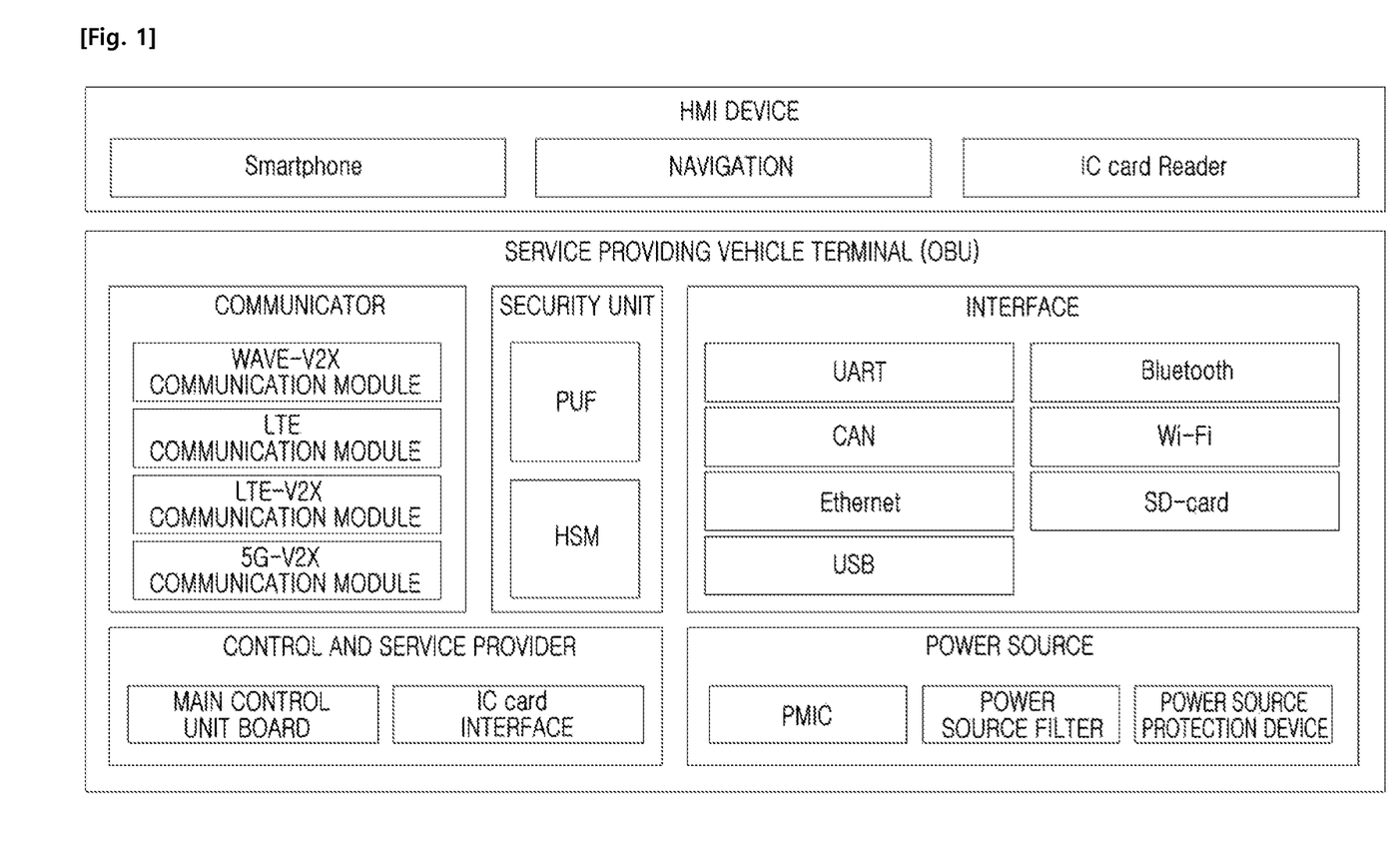
FIG. 1 is a view illustrating the concept of a hardware configuration of a hybrid vehicle on board unit for V2X communication according to an embodiment of the present disclosure.

FIG. 1 is a view illustrating the concept of a hardware configuration of a hybrid vehicle on board unit for V2X communication according to an embodiment of the present disclosure.

The hybrid vehicle on board unit according to an embodiment of the present disclosure may be loaded onto a vehicle to perform basic functions for exchanging data with other surrounding vehicles and infrastructures, and provide various services to a driver or to passengers using a message received from the other surrounding vehicles and infrastructures.

The hybrid vehicle on board unit according to an embodiment of the present disclosure may include a communicator, a security unit, an interface, a control and service provider and/or a power source. Each of the aforementioned element may perform each function independently, and may be controlled and managed by a CPU (controller) of a main control unit board included in the control and service provider.

The communicator may include a WAVE-V2X communication module, an LTE-V2X communication module, a 5G-V2X communication module and/or an LTE communication module. The WAVE-V2X communication module is a module that performs WAVE-V2X communication, and may include two physical wireless interfaces, and may be connected with the CPU through a USB. Moreover, the WAVE-V2X communication module may receive a PPS signal for channel synchronization from a GNSS module. The LTE-V2X communication module is a module that performs LTE-V2X communication, and may include one physical wireless interface, and may be connected with the CPU through the USB. Moreover, the LTE-V2X communication module may receive a PPS signal for hybrid synchronization and for accessing signals of less delay from the GNSS module. The 5G-V2X communication module is a module that performs 5G-V2X communication, and may include one physical wireless interface, and may be connected with the CPU through the USB. The LTE communication module is a module that performs communication with infrastructures in places other than 5G communication areas, and may include one physical wireless interface, and may be connected with the CPU through the USB.

The interface may include a UART module, a CAN module, an Ethernet module, a Bluetooth module, a Wi-Fi module, an SD card module and/or a USB module. The UART module may be used to be connected with peripheral devices such as IC card interface, OBD 2, and GNSS module, etc. Moreover, the UART module may include a port for connecting a Human Machine Interface (HMI) device. Here, the HMI device may include a smartphone, a navigation, and an IC card reader, etc. The CAN module may receive driving information and the like being transmitted from an Electronic Control Unit (ECU) of a vehicle using a CAN protocol. The Ethernet module may perform Ethernet communication with the peripheral devices and the infrastructures, and when a problem occurs, the Ethernet module access a Secure Shell (SSH) to perform debugging. The Bluetooth module may transceive data through Bluetooth. The Wi-Fi module may transceive data through Wi-Fi. The SD card module may store Log, multimedia, service data and the like besides eMMC flash. The SD card module is attachable and detachable, replaceable, and easy to repair and maintain, and its memory capacity may be adjusted and used according to the user's necessary range. The USB module may transceive data through a USB port.

The security unit may include a PUF module and/or an HSM module. The PUF module is a security module used for firmware protection and copy prevention, and may perform security functions on both software and hardware including unverified firmware. The HSM module may perform Elliptic Curve Digital Signature Algorithm (ECDSA) on secured messages being transceived in all V2X communications, enabling smooth and delayless communication even in vehicle congested areas and the like where a lot of messages are being transceived simultaneously.

The control and service provider may include a main control unit board, an HMI device and/or an IC card interface. The main control unit board may store firmware, operate the system, and drive a superior service. Moreover, the main control unit board may manage interfaces with the peripheral devices and manage operation of the entire vehicle on board unit. The main control unit board may include a CPU, a ROM, a RAM, and a PMIC, etc. The HMI device is a device for providing services to the user. The HMI device may operate upon receiving a command from the user, and may give warnings to the user about a sudden situation sensed internally/externally. The IC card interface is a device for recognizing a Hypass Card in order to support smart tailing of WAVE-V2X. Hypass fee payment may be made through the IC card interface.

The power source may include a PMIC module, a PoE module, a power source filter and/or a power source protection device. The PMIC module may supply power source to each element of the vehicle on board unit. The Power over Ethernet (PoE) module may supply data and power source through an Ethernet cable. The PoE module of the roadside unit may be receive power source through an RJ45 connector. According to another embodiment of the present disclosure, in order to separate an Ethernet PHY and the power source and supply data and power source, the PoE module may be used internally.

Figure 2:
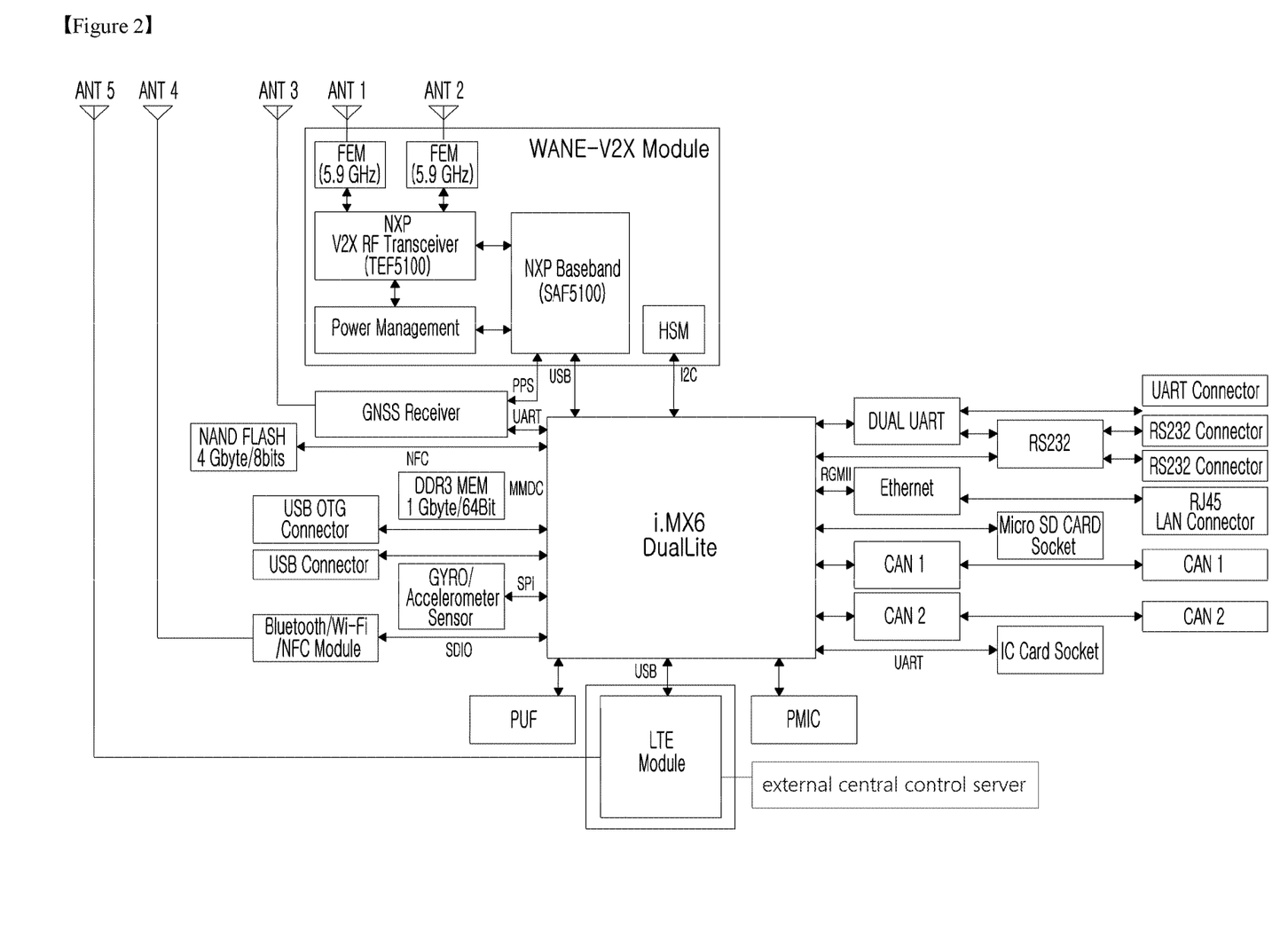
FIG. 2 is a view illustrating a configuration of a vehicle on board unit including a WAVE-V2X communication module and an LTE communication module according to an embodiment of the present disclosure.

FIG. 2 is a view illustrating a configuration of the vehicle on board unit including a WAVE-V2X communication module and an LTE communication module according to an embodiment of the present disclosure.

The vehicle on board unit according to an embodiment of the present disclosure may include a WAVE-V2X antenna, an LTE antenna, a GNSS antenna, a WAVE-V2X communication module, an LTE communication module, a GNSS module and/or a controller. The WAVE-V2X antenna may transceive a WAVE-V2X signal. The WAVE-V2X communication module may process the WAVE-V2X signal. The LTE antenna may transceive an LTE signal. The LTE communication module may process the LTE signal. The GNSS antenna may transceive a GNSS signal. The GNSS module may process the GNSS signal. The LTE communication module may transmit vehicle location information obtained based on the received GNSS signal and V2X communication information obtained based on the received WAVE-V2X signal to an external central control server, and receive additional information for vehicle operation from the central control server. The additional information may be included in the LTE signal and received through the LTE antenna. The controller may control the WAVE-V2X communication module to process the WAVE-V2X signal, and control the LTE communication module to process the LTE signal. i.MX6 DualLite illustrated in the drawings represent an embodiment of the controller.

Detailed explanation on the aforementioned configuration will be made hereinbelow.

Figure 3:
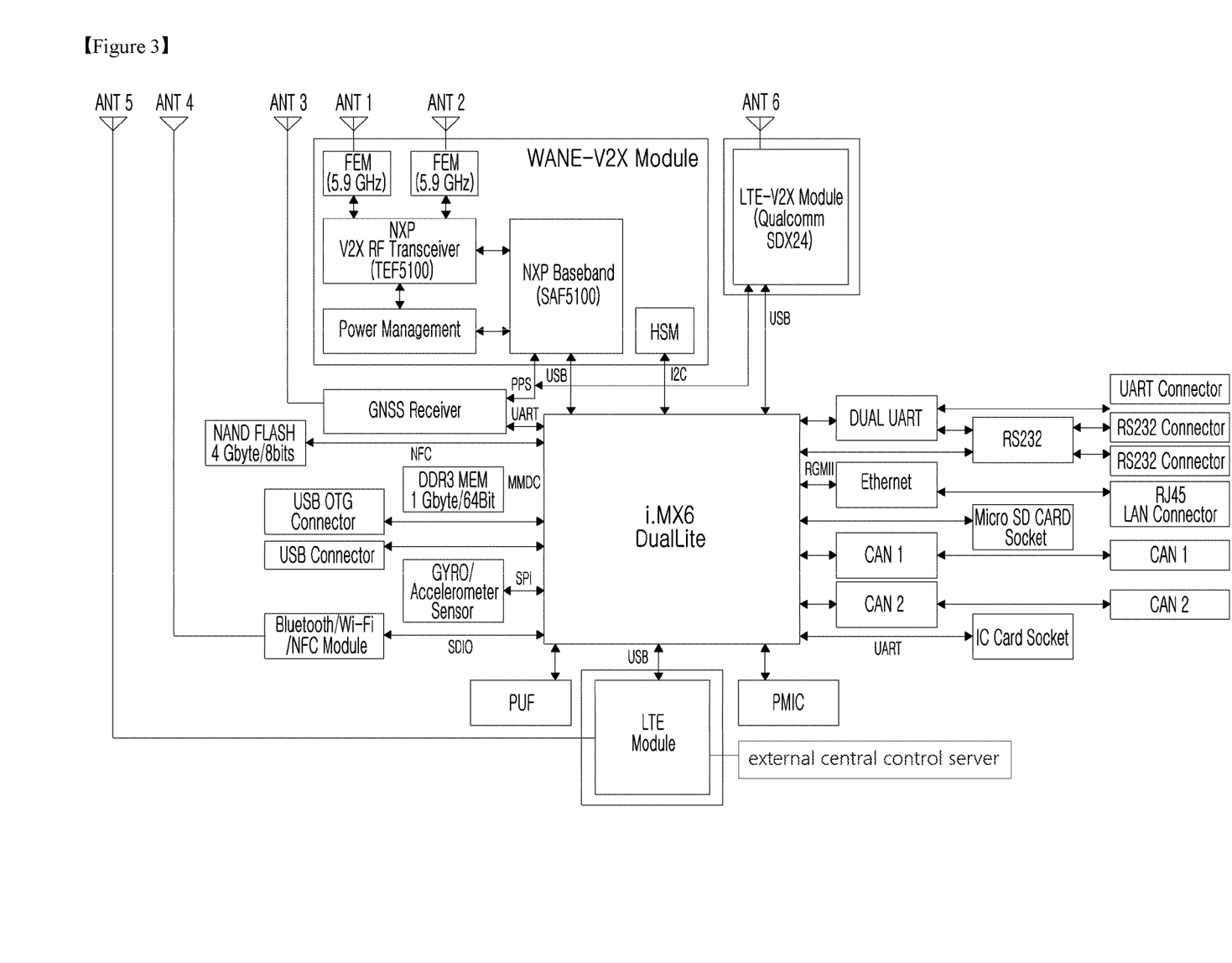
FIG. 3 is a view illustrating a configuration of a vehicle on board unit including a WAVE-V2X communication module, an LTE communication module and an LTE-V2X communication module according to an embodiment of the present disclosure.

FIG. 3 is a view illustrating a configuration of the vehicle on board unit including a WAVE-V2X communication module, an LTE communication module and an LTE-V2X communication module according to an embodiment of the present disclosure.

The vehicle on board unit according to an embodiment of the present disclosure may include a WAVE-V2X antenna for transceiving a WAVE-V2X signal, an LTE-V2X antenna for transceiving an LTE-V2X signal, an LTE antenna for transceiving an LTE signal, a GNSS antenna for transceiving a GNSS signal, a WAVE-V2X communication module for demodulating the WAVE-V2X signal received through the WAVE-V2X antenna to obtain WAVE-V2X communication information, and for modulating the WAVE-V2X communication information to generate the WAVE-V2X signal, an LTE-V2X communication module for demodulating the LTE-V2X signal received through the LTE-V2X antenna to obtain LTE-V2X communication information, and for modulating the LTE-V2X communication information to generate the LTE-V2X signal, a GNSS module for processing the GNSS signal received through the GNSS antenna to obtain location information of the vehicle, an LTE module for processing the LTE signal received through the LTE antenna to obtain additional information for operation of the vehicle, and for transmitting the WAVE-V2X communication information or the LTE-V2X communication information and the location information of the vehicle to an external central control server through the LTE antenna, and/or a controller for determining a signal having a greater intensity of the WAVE-V2X signal received through the WAVE-V2X antenna and the LTE-V2X signal received through the LTE-V2X antenna, and for controlling the WAVE-V2X communication module and the LTE-V2X communication module to process only the one determined signal.

According to another embodiment of the present disclosure, the controller may control the WAVE-V2X communication module and the LTE-V2X communication module to process both the WAVE-V2X signal received through the WAVE-V2X antenna and the LTE-V2X signal received through the LTE-V2X antenna, and the controller may compare the WAVE-V2X communication information obtained by processing the WAVE-V2X signal and the LTE-V2X communication information obtained by processing the LTE-V2X signal to check whether data overlaps, and control the WAVE-V2X communication module and the LTE-V2X communication module to delete overlapping data and to transmit only non-overlapping data.

According to another embodiment of the present disclosure, in response to the WAVE-V2X communication information obtained by processing the WAVE-V2X signal and the LTE-V2X communication information obtained by processing the LTE-V2X signal being information received from a same vehicle on board unit or roadside unit, the controller may control the WAVE-V2X communication module and the LTE-V2X communication module to mutually verify the WAVE-V2X communication information and the LTE-V2X communication information and to complement accuracy of information.

According to another embodiment of the present disclosure, there may be two WAVE-V2X antennas, and the WAVE-V2X communication module may process the WAVE-V2X signals received through the two antennas.

According to another embodiment of the present disclosure, the vehicle on board unit may further include an HSM module that performs Elliptic Curve Digital Signature Algorithm (ECDSA) on secured messages being transceived through the WAVE-V2X signal and/or the LTE-V2X signal, thereby providing smooth and delayless communication even in vehicle-congested areas where numerous messages are transceived simultaneously.

According to another embodiment of the present disclosure, the vehicle on board unit may include a NAND flash memory for storing the WAVE-V2X communication information, the LTE-V2X communication information and/or information received through the GNSS module.

According to another embodiment of the present disclosure, the vehicle on board unit may include a gyro sensor or an acceleration sensor for obtaining specific information on a velocity, location change and the like of the vehicle on which the vehicle on board unit is loaded. Pieces of information obtained through these sensors may be transceived to another vehicle on board unit, roadside unit and/or central control server through the WAVE-V2X communication module, the LTE-V2X communication module or the LTE module.

According to another embodiment of the present disclosure, the vehicle on board unit may further include a Bluetooth module, a Wi-Fi module and/or a NFC module, and further include an antenna for transceiving a Bluetooth signal, a Wi-Fi signal and/or a NFC signal. Therefore, the vehicle on board unit may receive information that cannot be received through the WAVE-V2X signal, the LTE-V2X signal and/or the LTE signal through Bluetooth, Wi-Fi or NFC.

According to another embodiment of the present disclosure, the vehicle on board unit may further include a PUF module. The PUF module is a security module for firmware protection and copy prevention, and may strengthen the security of the hardware and software of the vehicle on board unit.

According to another embodiment of the present disclosure, the vehicle on board unit may further include a CAN module. The CAN module may obtain operation information of the vehicle on which the vehicle on board unit is loaded through a CAN protocol. The obtained operation information may be transmitted to another vehicle on board unit, roadside unit and/or central control server through the WAVE-V2X communication module, the LTE-V2X communication module or the LTE module.

According to another embodiment of the present disclosure, the vehicle on board unit may further include an Ethernet module for transceiving an Ethernet signal. Here, information obtained through the Ethernet signal may be transmitted to another vehicle on board unit, roadside unit and/or central control server through the WAVE-V2X communication module, the LTE-V2X communication module or the LTE module.

According to another embodiment of the present disclosure, the vehicle on board unit may be connected to a peripheral device such as an HMI device and the like through a UART module. Pieces of information being received from the peripheral device may also be transmitted to another vehicle on board unit, roadside unit and/or central control server through the WAVE-V2X communication module, the LTE-V2X communication module or the LTE module.

Figure 4:
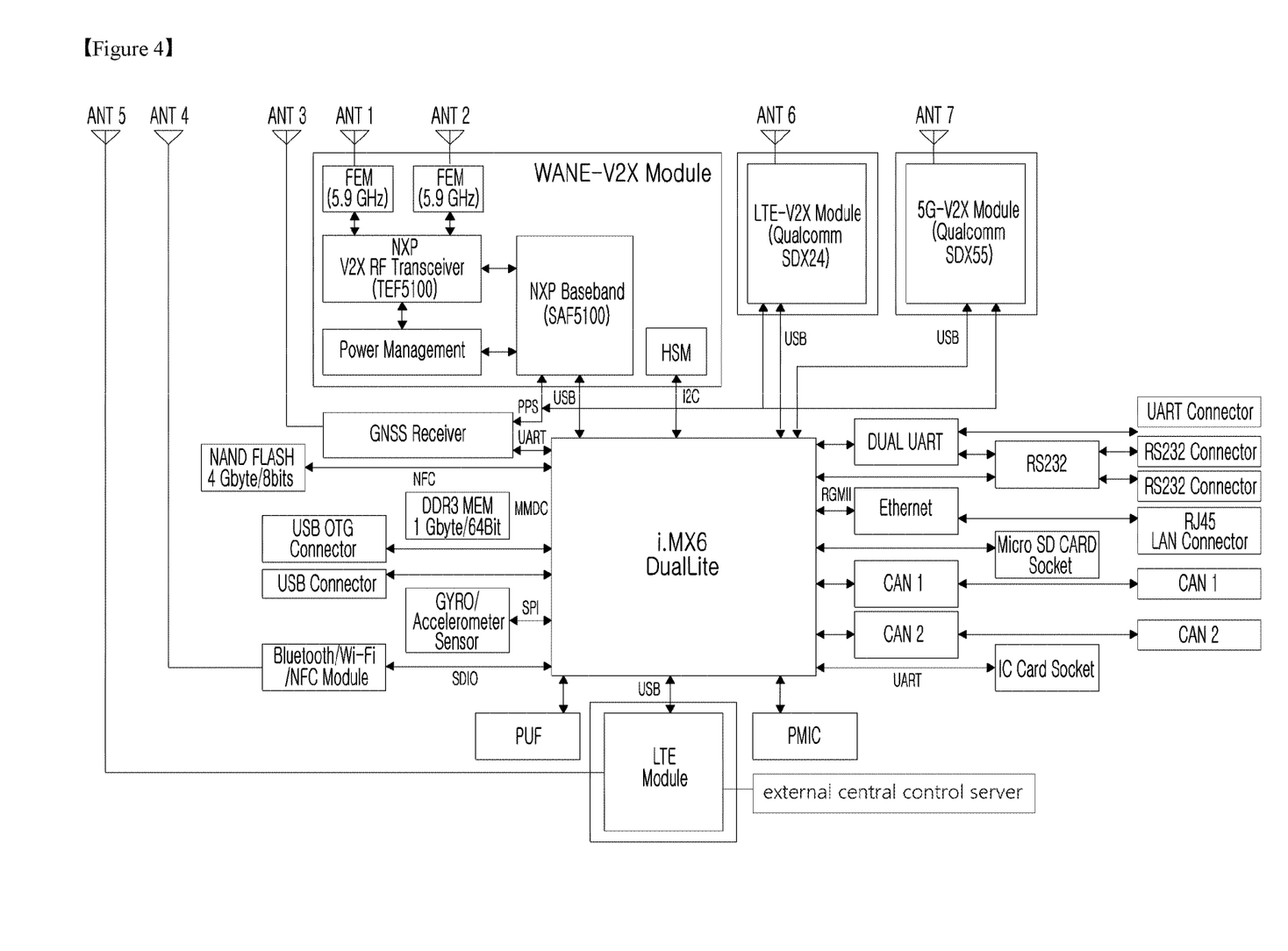
FIG. 4 is a view illustrating a configuration of a vehicle on board unit including a WAVE-V2X communication module, an LTE communication module, an LTE-V2X communication module and a 5G-V2X communication module according to an embodiment of the present disclosure.

FIG. 4 is a view illustrating a configuration of a vehicle on board unit including a WAVE-V2X communication module, an LTE communication module, an LTE-V2X communication module and a 5G-V2X communication module according to an embodiment of the present disclosure.

The vehicle on board unit according to an embodiment of the present disclosure may further include a 5G-V2X antenna and/or a 5G-V2X communication module for demodulating the 5G-V2X signal received through the 5G-V2X antenna to obtain 5G-V2X communication information, and for modulating the 5G-V2X communication information to generate the 5G-V2X signal.

According to an embodiment of the present disclosure, the LTE module included in the vehicle on board unit may transmit the WAVE-V2X communication information, the LTE-V2X communication information or 5G-V2X communication information and the location information of the vehicle to an external central control server through the LTE antenna, and the controller may determine a signal having a greater intensity from among the WAVE-V2X signal received through the WAVE-V2X antenna, the LTE-V2X signal received through the LTE-V2X antenna and the 5G-V2X signal received through the 5G-V2X antenna, and control the WAVE-V2X communication module, the LTE-V2X communication module and the 5G-V2X communication module to process only the one determined signal.

According to another embodiment of the present disclosure, the controller may control the WAVE-V2X communication module, the LTE-V2X communication module and the 5G-V2X communication module to process all of the WAVE-V2X signal received through the WAVE-V2X antenna, the LTE-V2X signal received through the LTE-V2X antenna and the 5G-V2X signal received through the 5G-V2X antenna, and the controller may control the WAVE-V2X communication module, the LTE-V2X communication module and the 5G-V2X communication module to compare the WAVE-V2X communication information obtained by processing the WAVE-V2X signal, the LTE-V2X communication information obtained by processing the LTE-V2X signal and the 5G-V2X communication information to check whether data overlaps, and to delete overlapping data and transmit only non-overlapping data.

According to another embodiment of the present disclosure, in response to the WAVE-V2X communication information obtained by processing the WAVE-V2X signal, the LTE-V2X communication information obtained by processing the LTE-V2X signal and the 5G-V2X communication information being information received from a same vehicle on board unit or roadside unit, the controller may control the WAVE-V2X communication module, the LTE-V2X communication module and the 5G-V2X communication module to mutually verify the WAVE-V2X communication information, the LTE-V2X communication information and the 5G-V2X communication information to complement accuracy of information.

According to another embodiment of the present disclosure, the LTE-V2X communication module and/or the 5G-V2X communication module may be (a) module(s) for processing communication signals based on mobile communication, and may transceive data with a mobile communication roadside unit other than the V2X roadside unit (base station) through LTE communication and/or 5G communication.

According to another embodiment of the present disclosure, the controller of the vehicle on board unit may compare communication performances of the WAVE-V2X signal, the LTE-V2X signal and the 5G-V2X signal at a location of the vehicle on board unit, and have one or two signals with excellent communication performance to be selected in combinations and processed. Here, the controller may compare the communication performances of Packet Error Rate (PER) performance, latency performance, data throughput performance, maximum effective communication distance performance and/or Received Signal Strength Indicator (RSSI) performance.

According to another embodiment of the present disclosure, at a current location of the vehicle where the vehicle on board unit is loaded and using the location information received through the GNSS antenna, the controller of the vehicle on board unit may select a V2X communication signal (WAVE-V2X signal, LTE-V2X signal or 5G-V2X signal) having the most excellent communication performance in the relationship with the roadside unit or the vehicle on board unit of the target vehicle to which data is to be sent, and transmit the data through the corresponding communication module.

According to another embodiment of the present disclosure, the vehicle on board unit may further include a 5G module. The 5G module may transmit the communication information obtained through a plurality of V2X communication modules to the central control server, another vehicle on board unit and/or roadside unit through 5G communication. Here, the controller may consider the current location of the vehicle and the communication performance, signal intensity and the like of both signals, in order to determine whether to use the LTE signal or the 5G signal for the communication with the central control server.

According to another embodiment of the present disclosure, the controller may provide Bluetooth communication applications, C-ITS trial project Daejeon-Seijong 15 service applications, SCMS certificate management applications, in vehicle devices linkage and information collection/processing interface applications, 3GPP TR 22.886 service applications, LTE-V2X/5G-V2X specialized service applications, autonomous driving vehicle supporting interface applications, equipment state check and service operation management applications, PUF linkage firmware protection and IP protection operation applications and/or V2X message security modules (IEEE 1609.2) applications.

Hybrid Roadside Unit for V2X Communication

Referring to FIGS. 5 to 8, explanation on the hybrid roadside unit for V2X communication according to an embodiment of the present disclosure will be made hereinbelow.

Figure 5:
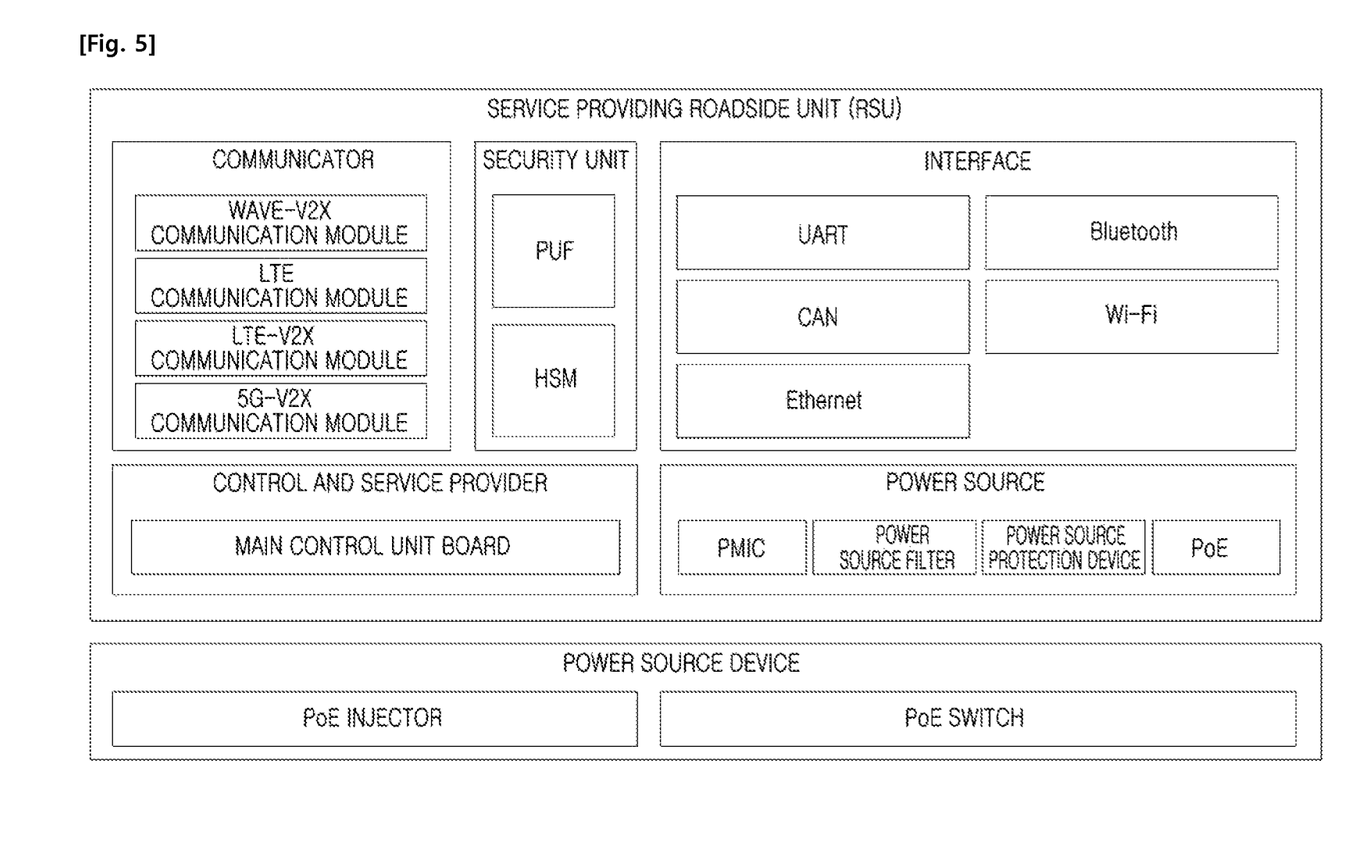
FIG. 5 is a view illustrating the concept of a hardware configuration of a hybrid roadside unit for V2X communication according to an embodiment of the present disclosure.

FIG. 5 is a view illustrating the concept of a hardware configuration of the hybrid roadside unit for V2X communication according to an embodiment of the present disclosure.

The hybrid roadside unit for V2X communication according to an embodiment of the present disclosure may include a communicator, a security unit, an interface, a control and service provider, a power source and/or a power device. Each of the aforementioned element performs each function independently, and may be controlled and managed by the CPU (controller) of the main control unit board included in the control and service provider. The communicator may include a WAVE-V2X communication module, an LTE-V2X communication module, a 5G-V2X communication module and/or an LTE communication module. The interface may include a UART module, a CAN module, an Ethernet module, a Bluetooth module and/or a Wi-Fi module. The security module may include a PUF module and/or an HSM module. The control and service provider may include a main control unit board. The power source may include a PMIC module, a PoE module, a power source filter and/or a power source protection device. The power source device may include a PoE injector and/or a PoE switch. The PoE injector may perform the function of separating the data and power source being received into the Ethernet module, and the PoE switch may adjust the on/off of the power source being provided by the PoE module.

Detailed explanation of the aforementioned configuration was made with reference to FIGS. 1 and 3.

Figure 6:
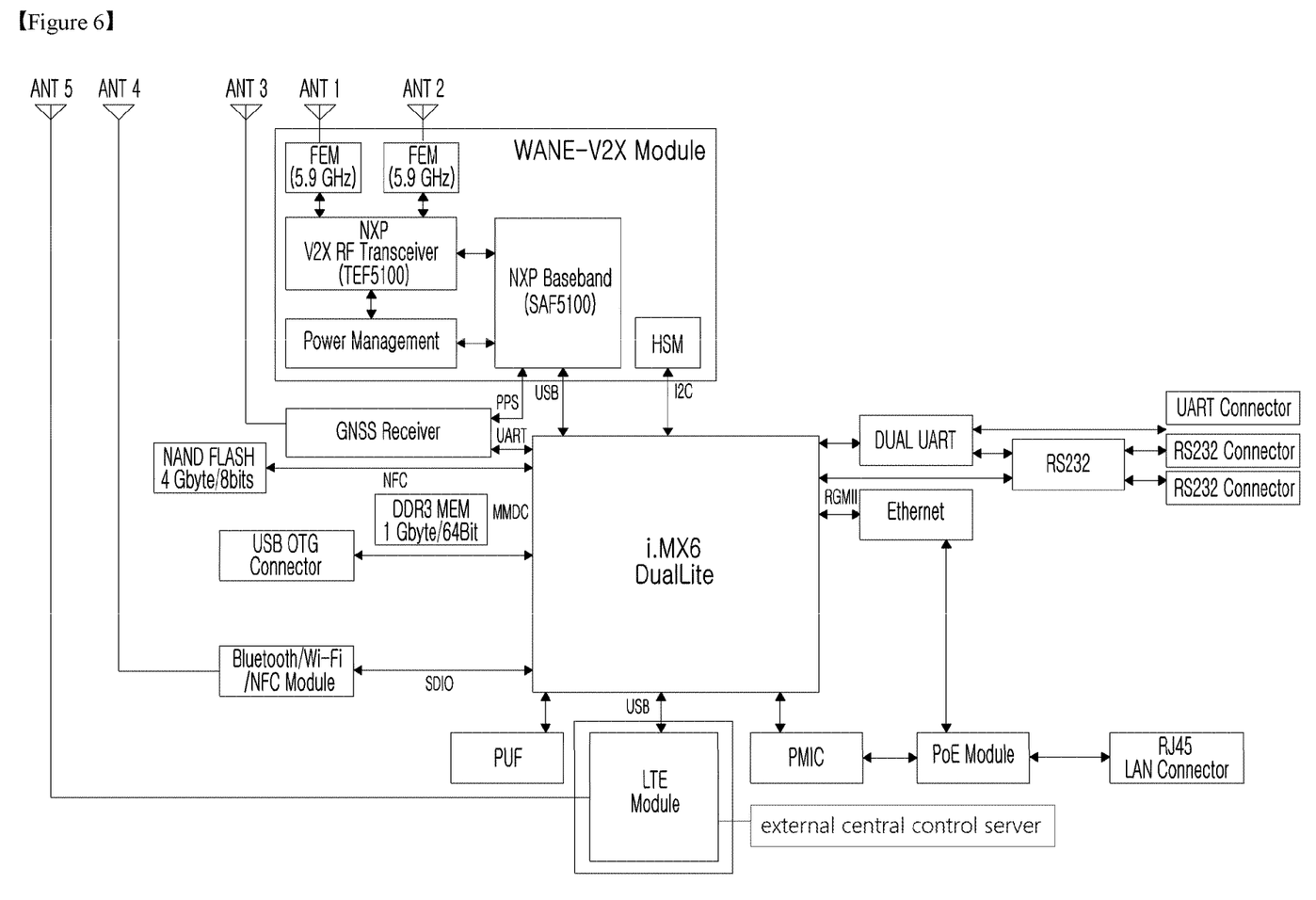
FIG. 6 is a view illustrating a configuration of a roadside unit including a WAVE-V2X communication module and an LTE communication module according to an embodiment of the present disclosure.

FIG. 6 is a view illustrating the configuration of the roadside unit including the WAVE-V2X communication module and the LTE communication module according to an embodiment of the present disclosure.

The roadside unit according to an embodiment of the present disclosure may include a WAE-V2X antenna for transceiving a WAVE-V2X signal, an LTE antenna for transceiving an LTE signal, a GNSS antenna for transceiving a GNSS signal, a WAVE-V2X communication module for demodulating the WAVE-V2X signal received through the WAVE-V2X antenna to obtain WAVE-V2X communication information, and for modulating the WAVE-V2X communication information to generate the WAVE-V2X signal, a GNSS module for processing the GNSS signal received through the GNSS antenna to obtain location information of the roadside unit, an LTE module for processing the LTE signal received through the LTE antenna to obtain additional information for operation of the roadside unit, and for transmitting the WAVE-V2X communication information and the location information of the roadside unit to an external central control server through the LTE antenna, and/or a controller for controlling the WAVE-V2X communication module to process the WAVE-V2X signal received through the WAVE-V2X antenna.

Detailed explanation on the aforementioned configuration will be made hereinbelow.

Figure 7:
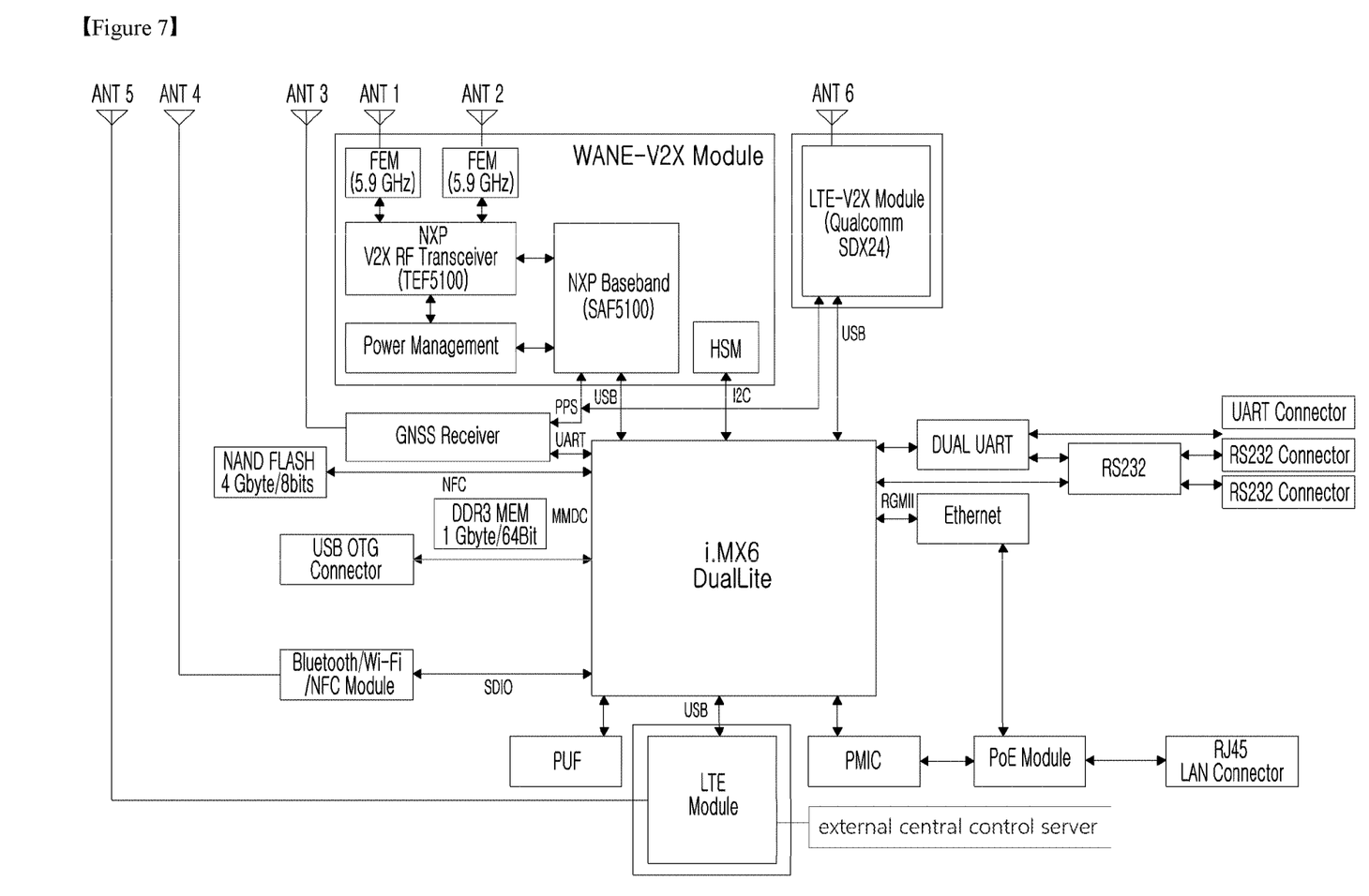
FIG. 7 is a view illustrating a configuration of a roadside unit including a WAVE-V2X communication module, an LTE communication module and an LTE-V2X communication module according to an embodiment of the present disclosure.

FIG. 7 is a view illustrating the configuration of the roadside unit including a WAVE-V2X communication module, an LTE-communication module and an LTE-V2X communication module according to an embodiment of the present disclosure.

The roadside unit according to an embodiment of the present disclosure may include a WAVE-V2X antenna for transceiving a WAVE-V2X signal, an LTE-V2X antenna for transceiving an LTE-V2X signal, an LTE antenna for transceiving an LTE signal, a GNSS antenna for transceiving a GNSS signal, a WAVE-V2X communication module for demodulating the WAVE-V2X signal received through the WAVE-V2X antenna to obtain WAVE-V2X communication information, and for modulating the WAVE-V2X communication information to generate the WAVE-V2X signal, an LTE-V2X communication module for demodulating the LTE-V2X signal received through the LTE-V2X antenna to obtain LTE-V2X communication information, and for modulating the LTE-V2X communication information to generate the LTE-V2X signal, a GNSS module for processing the GNSS signal received through the GNSS antenna to obtain location information of the roadside unit, an LTE module for processing the LTE signal received through the LTE antenna to obtain additional information for operation of the roadside unit, and for transmitting the WAVE-V2X communication information or the LTE-V2X communication information and the location information of the roadside unit to an external central control server through the LTE antenna, and/or a controller for determining a signal having a greater intensity of the WAVE-V2X signal received through the WAVE-V2X antenna and the LTE-V2X signal received through the LTE-V2X antenna, and for controlling the WAVE-V2X communication module and the LTE-V2X communication module to process only the one determined signal.

According to another embodiment of the present disclosure, the controller may control the WAVE-V2X communication module and the LTE-V2X communication module to process both the WAVE-V2X signal received through the WAVE-V2X antenna and the LTE-V2X signal received through the LTE-V2X antenna, and the controller may control the WAVE-V2X communication module and the LTE-V2X communication module to compare the WAVE-V2X communication information obtained by processing the WAVE-V2X signal and the LTE-V2X communication information obtained by processing the LTE-V2X signal to check whether data overlaps, and to delete overlapping data and transmit only non-overlapping data.

According to another embodiment of the present disclosure, in response to the WAVE-V2X communication information obtained by processing the WAVE-V2X signal and the LTE-V2X communication information obtained by processing the LTE-V2X signal being information received from a same vehicle on board unit or roadside unit, the controller may control the WAVE-V2X communication module and the LTE-V2X communication module to mutually verify the WAVE-V2X communication information and the LTE-V2X communication information and compensate accuracy of information.

According to another embodiment of the present disclosure, there may be two WAVE-V2X antennas, and the WAVE-V2X communication module may process the WAVE-V2X signal received through the two antennas.

According to another embodiment of the present disclosure, the roadside unit may further include an HSM module that performs Elliptic Curve Digital Signature Algorithm (ECDSA) on secured messages being transceived through the WAVE-V2X signal and/or the LTE-V2X signal, thereby providing smooth and delayless communication even in vehicle-congested areas where numerous messages are transceived simultaneously.

According to another embodiment of the present disclosure, the vehicle on board unit may include a NAND flash memory for storing the WAVE-V2X communication information, the LTE-V2X communication information and/or information received through the GNSS module.

According to another embodiment of the present disclosure, the roadside unit may further include a Bluetooth module, a Wi-Fi module and/or an NFC module, and further include an antenna for transceiving a Bluetooth signal, a Wi-Fi signal and/or an NFC signal. Therefore, the roadside unit may receive information that cannot be received through the WAVE-V2X signal, the LTE-V2X signal and/or the LTE signal through Bluetooth, Wi-Fi or NFC.

According to another embodiment of the present disclosure, the roadside unit may further include a PUF module. The PUF module is a security module for firmware protection and copy prevention, and may strengthen security of the hardware and software of the roadside unit.

According to another embodiment of the present disclosure, the roadside unit may further include an Ethernet module for transceiving the Ethernet signal. Here, information obtained through the Ethernet signal may be transmitted to another vehicle on board unit, roadside unit and/or central control server through the WAVE-V2X communication module, the LTE-V2X communication module or the LTE module.

According to another embodiment of the present disclosure, the roadside unit may be connected to a peripheral device such as an HMI device and the like through a UART module. Pieces of information being received from the peripheral device may also be transmitted to another vehicle on board unit, roadside unit and/or central control server through the WAVE-V2X communication module, the LTE-V2X communication module or the LTE module.

According to another embodiment of the present disclosure, the roadside unit may further include a PoE module. The PoE module is a module for connecting the Ethernet module and the PMIC module, and the PoE module may separate the power source from the Ethernet module and supply the power source to the roadside unit through the PMIC module.

Figure 8:
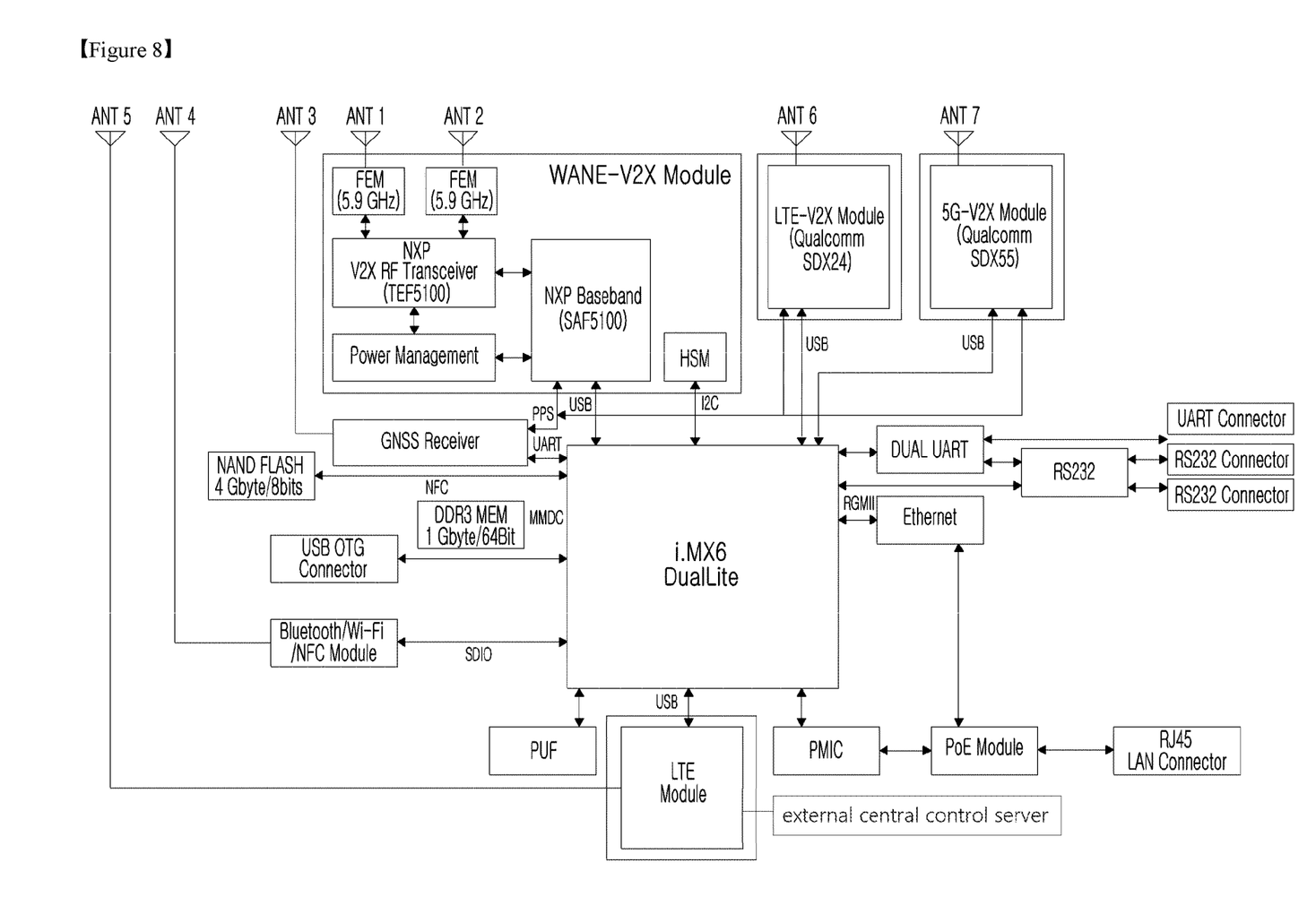
FIG. 8 is a view illustrating a configuration of a roadside unit including a WAVE-V2X communication module, an LTE communication module, an LTE-V2X communication module and a 5G-V2X communication module according to an embodiment of the present disclosure.

FIG. 8 is a view illustrating the configuration of the roadside unit including the WAVE-V2X communication module, the LTE communication module, the LTE-V2X communication module and the 5G-V2X communication module according to an embodiment of the present disclosure.

The roadside unit according to an embodiment of the present disclosure may further include a 5G-V2X antenna for transceiving the 5G-V2X signal and/or a 5G-V2X communication module for demodulating the 5G-V2X signal received through the 5G-V2X antenna to obtain 5G-V2X communication information, and for modulating the 5G-V2X communication information to generate the 5G-V2X signal, in addition to the configuration of the roadside unit according to the embodiment of FIG. 7.

According to an embodiment of the present disclosure, the LTE-module included in the roadside unit may transmit the WAVE-V2X communication information, the LTE-V2X communication information or 5G-V2X communication information and the location information of the vehicle to the external central control server through the LTE antenna, and the controller may control the WAVE-V2X communication module, the LTE-V2X communication module and the 5G-V2X communication module to determine a signal having a greater intensity from among the WAVE-V2X signal received through the WAVE-V2X antenna, the LTE-V2X signal received through the LTE-V2X antenna and the 5G-V2X signal received through the 5G-V2X antenna, and for controlling the WAVE-V2X communication module, the LTE-V2X communication module and the 5G-V2X communication module to process only the one determined signal.

According to another embodiment of the present disclosure, the controller may control the WAVE-V2X communication module, the LTE-V2X communication module and the 5G-V2X communication module to process all of the WAVE-V2X signal received through the WAVE-V2X antenna, the LTE-V2X signal received through the LTE-V2X antenna and the 5G-V2X signal received through the 5G-V2X antenna, and the controller may control the WAVE-V2X communication module, the LTE-V2X communication module and the 5G-V2X communication module to compare the WAVE-V2X communication information obtained by processing the WAVE-V2X signal, the LTE-V2X communication information obtained by processing the LTE-V2X signal and the 5G-V2X communication information to check whether data overlaps, and to delete overlapping data and transmit only non-overlapping data.

According to another embodiment of the present disclosure, in response to the WAVE-V2X communication information obtained by processing the WAVE-V2X signal, the LTE-V2X communication information obtained by processing the LTE-V2X signal and the 5G-V2X communication information being information received from a same vehicle on board unit or roadside unit, the controller may control the WAVE-V2X communication module, the LTE-V2X communication module and the 5G V2X communication module to mutually verify the WAVE-V2X communication information, the LTE-V2X communication information and the 5G-V2X communication information to complement accuracy of information.

According to another embodiment of the present disclosure, the LTE-V2X communication module and/or the 5G-V2X communication module may be (a) module(s) for processing communication signals based on mobile communication, and may transceive data with a mobile communication roadside unit other than the V2X roadside unit through LTE communication and/or 5G communication.

According to another embodiment of the present disclosure, the controller of the roadside unit may compare communication performances of the WAVE-V2X signal, the LTE-V2X signal and the 5G-V2X signal at a location of the roadside unit, and have one or two signals with excellent communication performance to be selected in combinations and processed. Here, the controller may compare the communication performances of Packet Error Rate (PER) performance, latency performance, data throughput performance, maximum effective communication distance performance and/or Received Signal Strength Indicator (RSSI) performance.

According to another embodiment of the present disclosure, at a current location of the roadside unit and using the location information received through the GNSS antenna, the controller of the roadside unit may select a V2X communication signal (WAVE-V2X signal, LTE-V2X signal or 5G-V2X signal) having the most excellent communication performance in the relationship with the vehicle on board unit of the target vehicle to which data is to be sent or another roadside unit, and transmit the data through the corresponding communication module.

The protection scope of the present disclosure is not limited to the disclosure and expressions of the embodiments explained specifically above. Further, it is to be noted that the protection scope of the present disclosure shall not be limited by any changes or substitution obvious in those in the art of the present disclosure.

What is claimed is:
1. A hybrid vehicle on board unit for V2X communication, comprising:
a WAVE-V2X antenna for transceiving a WAVE-V2X signal;
an LTE-V2X antenna for transceiving an LTE-V2X signal;
an LTE antenna for transceiving an LTE signal;
a GNSS antenna for transceiving a GNSS signal;
a WAVE-V2X communication module for demodulating the WAVE-V2X signal received through the WAVE-V2X antenna to obtain WAVE-V2X communication information, and for modulating the WAVE-V2X communication information to generate the WAVE-V2X signal;
an LTE-V2X communication module for demodulating the LTE-V2X signal received through the LTE-V2X antenna to obtain LTE-V2X communication information, and for modulating the LTE-V2X communication information to generate the LTE-V2X signal;
a GNSS module for processing the GNSS signal received through the GNSS antenna to obtain location information of a vehicle;
an LTE module for processing the LTE signal received through the LTE antenna to obtain additional information for operation of the vehicle, and for transmitting the WAVE-V2X communication information or the LTE-V2X communication information and the location of the vehicle to an external central control server through the LTE antenna; and a controller for determining a signal having a greater intensity of the WAVE-V2X signal received through the WAVE-V2X antenna and the LTE-V2X signal received through the LTE-V2X antenna, and for controlling the WAVE-V2X communication module and the LTE-V2X communication module to process only the one determined signal, wherein the controller controls the WAVE-V2X communication module and the LTE-V2X communication module to process both the WAVE-V2X signal received through the WAVE-V2X antenna and the LTE-V2X signal received through the LTE-V2X antenna, and the controller compares the WAVE-V2X communication information obtained by processing the WAVE-V2X signal and the LTE-V2X communication information obtained by processing the LTE-V2X signal to check whether data overlaps, and controls the WAVE-V2X communication module and the LTE-V2X communication module to delete overlapping data and to transmit only non-overlapping data.

2. The hybrid vehicle on board unit for V2X communication according to claim 1, wherein in response to the WAVE-V2X communication information obtained by processing the WAVE-V2X signal and the LTE-V2X communication information obtained by processing the LTE-V2X signal being information received from a same vehicle on board unit or roadside unit, the controller controls the WAVE-V2X communication module and the LTE-V2X communication module to mutually verify the WAVE-V2X communication information and the LTE-V2X communication information and to complement accuracy of information.

3. The hybrid vehicle on board unit for V2X communication according to claim 1, further comprising:

a 5G-V2X antenna for transceiving a 5G-V2X signal; and a 5G-V2X communication module for demodulating the 5G-V2X signal received through the 5G-V2X antenna to obtain 5G-V2X communication information, and for modulating the 5G-V2X communication information to generate the 5G-V2X signal, and the LTE module transmits the WAVE-V2X communication information, the LTE-V2X communication information or 5G-V2X communication information and the location information of the vehicle to the external central control server through the LTE antenna, and the controller controls the WAVE-V2X communication module, the LTE-V2X communication module and the 5G-V2X communication module to determine the signal having a greater intensity from among the WAVE-V2X signal received through the WAVE-V2X antenna, the LTE-V2X signal received through the LTE-V2X antenna, and the 5G-V2X signal received through the 5G-V2X antenna, and to control the WAVE-V2X communication module, the LTE-V2X communication module and the 5G-V2X communication module to process only the one determined signal.

4. A roadside unit for V2X communication, comprising:

a WAVE-V2X antenna for transceiving a WAVE-V2X signal;

an LTE-V2X antenna for transceiving an LTE-V2X signal;

an LTE antenna for transceiving an LTE signal;

a GNSS antenna for transceiving a GNSS signal;

a WAVE-V2X communication module for demodulating the WAVE-V2X signal received through the WAVE-V2X antenna to obtain WAVE-V2X communication information, and for modulating the WAVE-V2X communication information to generate the WAVE-V2X signal;

an LTE-V2X communication module for demodulating the LTE-V2X signal received through the LTE-V2X antenna to obtain LTE-V2X communication information, and for modulating the LTE-V2X communication information to generate the LTE-V2X signal;

a GNSS module for processing the GNSS signal received through the GNSS antenna to obtain location information of the roadside unit;

an LTE module for processing the LTE signal received through the LTE antenna to obtain additional information for operation of the roadside unit, and for transmitting the WAVE-V2X communication information or the LTE-V2X communication information and the location information of the roadside unit to an external central control server through the LTE antenna; and a controller for determining a signal having a greater intensity from among the WAVE-V2X signal received through the WAVE-V2X antenna and the LTE-V2X signal received through the LTE-V2X antenna, and for controlling the WAVE-V2X communication module and the LTE-V2X communication module to process only the one determined signal, wherein the controller controls the WAVE-V2X communication module and the LTE-V2X communication module to process both the WAVE-V2X signal received through the WAVE-V2X antenna and the LTE-V2X signal received through the LTE-V2X antenna, and the controller compares the WAVE-V2X communication information obtained by processing the WAVE-V2X signal and the LTE-V2X communication information obtained by processing the LTE-V2X signal to check whether data overlaps, and controls the WAVE-V2X communication module and the LTE-V2X communication module to delete overlapping data and to transmit only non-overlapping data.

* * * * *